No. 883,304. PATENTED MAR. 31, 1908.
J. W. ESPICH.
CULTIVATOR ATTACHMENT FOR THINNING COTTON.
APPLICATION FILED MAY 31, 1907.

Witnesses
Evan Evans
Mabel B. Marble

Inventor
John W. Espich
By A. D. Marble
Attorney

UNITED STATES PATENT OFFICE.

JOHN W. ESPICH, OF CARNEY, OKLAHOMA, ASSIGNOR OF ONE-THIRD TO E. G. POWELL, OF CARNEY, OKLAHOMA.

CULTIVATOR ATTACHMENT FOR THINNING COTTON.

No. 883,304.     Specification of Letters Patent.     Patented March 31, 1908.

Application filed May 31, 1907. Serial No. 376,582.

*To all whom it may concern:*

Be it known that I, JOHN W. ESPICH, a citizen of the United States, residing at Carney, in the county of Lincoln, Oklahoma, have invented certain new and useful Improvements in Cultivator Attachments for Thinning Cotton, of which the following is a specification.

My invention relates to cultivator attachments for thinning out the growing cotton while young and when planted in rows, which is the usual way and the thinning process is commonly termed "chopping cotton."

Briefly, my invention consists of an arch or yoke adjustably secured to the cultivator beams, the feet of its legs resting in socket standards which carry revoluble shafts connected by a knuckle or universal joint, each shaft having secured thereon a cultivator disk having peripheral off-sets.

The objects of my invention are: first to provide an implement adapted to be easily attached to any cultivator and perform the task of thinning the cotton and assist in cultivating it at the same time; second, that it shall be efficient and easy of operation; third to save time and expense; fourth, to provide a comparatively inexpensive implement or attachment for the purpose. I attain these objects by the mechanism illustrated in the accompanying drawings forming a part of this specification, in which—

Figure 1:
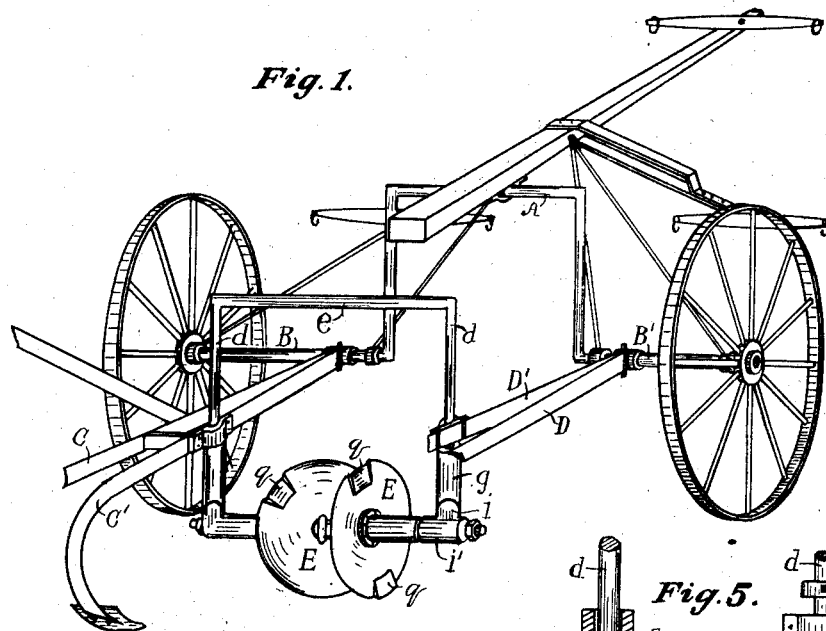
Figure 6:
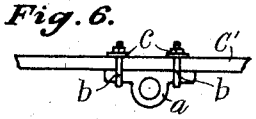
Figure 5:
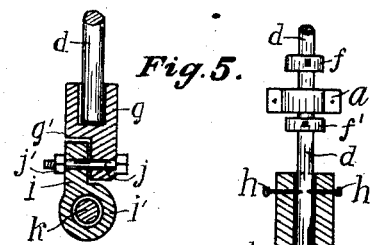
Figure 3:
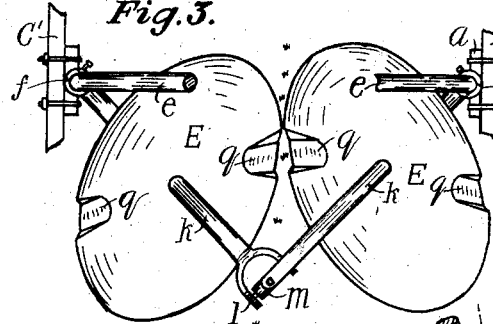
Figure 2:
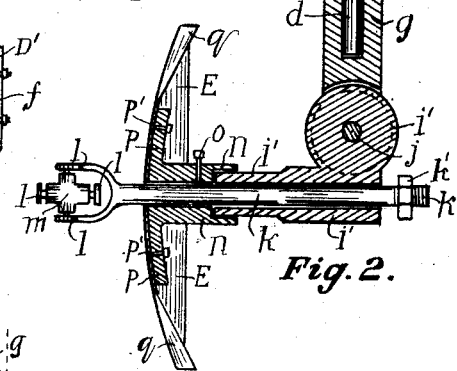
Figure 4:
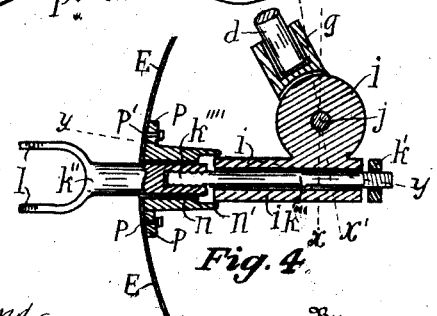

Figure 1 is a view in perspective of my invention as attached to a cultivator ready for use; Fig. 2 is a part sectional elevation of the right half as viewed from the rear; Fig. 3 is a plan view the cultivator being removed; Fig. 4 is Fig. 2 modified; Fig. 5 is a cross section of Fig. 4 on line $x'$; Fig. 6 is a plan view of the clamping-block with a section of the cultivator beam.

Similar letters refer to similar parts in the several views.

Referring to the drawings, A is the cultivator arch of which the axles B and B' are in the present case horizontal extensions of the same and to which the cultivator beams C, C' and D, D' are attached, being in pairs the inner ones having secured thereto the arch-supporting blocks $a\ a$ by means of the stirrup-bolts $b\ b$ and their plates $c\ c$, forming a rigid and adjustable attachment, the legs $d\ d$ of the attachment arch or yoke $e$ extend vertically through the circular opening in each of said arch-supporting blocks $a$ causing the said arch $e$ to maintain an upright position, yet permitting a vertical and lateral movement, the vertical movement being controlled by the adjustable collars $f$ and $f'$ provided with set-screws and encompassing the said arch legs $d\ d$ one of which is disposed above and the other below the said arch-supporting blocks for the purpose of regulating the elevation and depression of the arch $e$ and the parts attached thereto; the terminals or feet of the arch legs $d\ d$ rest in sockets adapted thereto in boots or socket-standards $g\ g$ and are subject to rotary and vertical adjustment and may be firmly secured in any desired position, by means of the set-screws $h\ h$, the lower portion of the said standards $g$ have shoulders $g'$ as if made of wrought iron rods hammered upon one side and forcing the hammered portion equally in a lateral direction the flattened portion of each being perforated for a bolt to form a joint in connection with the circular-like lug $i$ projecting upward from the heel portion of the journal-box sleeve $i'$ and having a like perforation adapted to the bolt $j$ provided with a threaded nut $j'$ adapted thereto and by means of which the said journal-box sleeve may be set at the desired angle to the normally vertical socket-standards $g\ g$ and be firmly secured in such position, see Figs. 1, 2, 4 and 5, the ordinary angle being indicated by the dotted lines $x'$ and $y$ in Fig. 4.

Within and extending through the journal-box sleeve $i'$ is the rotatable shaft $k$ having a nut $k'$ threaded upon its outer end, its opposite end terminating in a stirrup or yoke $l$ having its like prongs perforated for the terminals of the equal-armed cross $m$ constituting a universal joint when the two like shafts $k\ k$ are connected by the equal-armed cross or knuckle $m$, see Figs. 2 and 3; this form of joint connection is simple and efficient, but any other connection may be adopted which will insure the uniform rotation of the said shafts $k\ k$, which have adjustably secured thereon the disk-collars $n\ n$, being duplicates, each having a bore adapted to the size of the shaft $k$ and having one or more set-screws $o$ by which to secure firmness of position and insure their mutual rotation, see Figs. 2 and 4, in which it will be seen that the disk-collar has the end of its stem molded or cut in a manner to form a sand or dust band $n'$ adapted to project over the inner end of the journal-box sleeve $i'$ to prevent dust from entering said sleeve and causing undue erosion of the sleeve and the shaft $k$; the opposite end of the disk collar $n$ terminates in a disk-flange $p$ having a face contour to fit the disk E which is firmly secured thereto by three or more "plow bolts" $p'$; the said disk being similar in size and form to the ordinary cultivator disk, except that, upon two opposite points of its periphery it is off-set two inches (more or less) toward its concave side and four inches (more or less) peripherally, decreasing in width and depth as the disk center is approached and terminating at about one half the radial distance, the purpose of the off-sets $q$ is to leave a square or portion of the soil in the row of cotton undisturbed the length of the off-set peripherally and equal in width to twice the off-set in consequence of the disks being set upon their respective shafts $k$ in a manner that they will always register or be in the same relative position during their revolutions which is caused by the friction of the ground upon the disks when in active service. To prevent lodgment of the soil in the corners of the off-sets $q q$ the said corners are slightly rounded, or semi-oval or other formed off-sets may be made.

A modified form of the disk shaft $k$ is shown in Fig. 4, in which the stirrup portion $k''$ has an enlarged diameter and a threaded socket adapted to the threaded tenon $k''''$ of the turned journal portion $k'''$ which may be made of steel and the other portion $k''$ may be cast, or may be formed of malleable iron. In the present case a walking tongue cultivator is shown as having one of my cotton thinning attachments secured to it, but it is adapted to a tongueless cultivator and to a riding or sulky cultivator as well.

In operation, by stirrup or staple bolts $b$ secure the clamping blocks $a a$ to the cultivator beams $C'$ and $D'$ in such position that the disks will set in the ground a little in advance of the inner shovels of the cultivator and about two inches in the ground, set the arch leg collars $f f'$ closely above and below the arch-supporting blocks and with their set-screws secure them firmly; by means of the set-screws $h$ and the bolts $j$ set the disks in a position that their edges in the ground will nearly touch and move the soil to the right and left of a central line or path, thus cutting and moving all weeds and surface soil in the row of cotton, except where in their revolution the off-sets $q$ leave undisturbed patches and the cotton in those patches is left unharmed. Care must be taken to follow the row and to guide the team and cultivator properly and thus make the attachment not only thin the cotton but help to cultivate it. It will be understood that the common mode of planting cotton is to drill it in rows about four feet apart, placing the seeds about an inch apart, and when from two to four inches high thin it by removing all except one or two stalks or plants in each place from 14 to 20 inches apart, which with my thinning attachment is determined by the diameter of the disks E E which are duplicates, and the number of plants to be left in each place is determined by the peripheral length of the off-set $q$.

Different styles of cultivators may require limited modifications of the cultivator attachment for thinning cotton of that herein shown and described which may be done without departing from the spirit of my invention.

Having thus described my invention what I claim as new and useful and desire to secure by Letters Patent is—

1. A cultivator attachment for thinning cotton having an arch or yoke with a pair of legs having thereon vertically adjustable collars, arch-supporting blocks and duplicate socket-standards in which said legs terminate and in which they are adjustably secured; journal-box sleeves adjustably secured to said standards; disk shafts $k k$ rotatably secured in said sleeves their outer ends being provided with threads and nuts and their inner ends terminating in stirrups or yokes having equal arms $l$ in the ends of which are located the terminals of the equal armed cross $m$ to form a universal joint and insure the uniform reciprocal rotation of the two shafts, for the purposes set forth.

2. A cultivator attachment for thinning cotton consisting of an arch the legs of which have secured thereon adjusting collars and arch-supporting blocks to be clamped to cultivator beams said legs terminating in socket-standards adjustably secured thereto and said standards having adjustably secured to their lower ends journal-box sleeves carrying rotatable disk shafts; the disks E E having peripheral off-sets $q$ together with and including the disk-collars $n n$ to which the disks are bolted, the outer terminals of said collars forming dust-bands to protect from abnormal wear the shafts to which the said collars are adjustably secured, as described and for the purposes set forth.

In testimony whereof I affix my signature in presence of two witnesses.

JOHN W. ESPICH.

Witnesses:
 M. E. ELLIS,
 A. ELLIS.